United States Patent Office 3,372,090
Patented Mar. 5, 1968

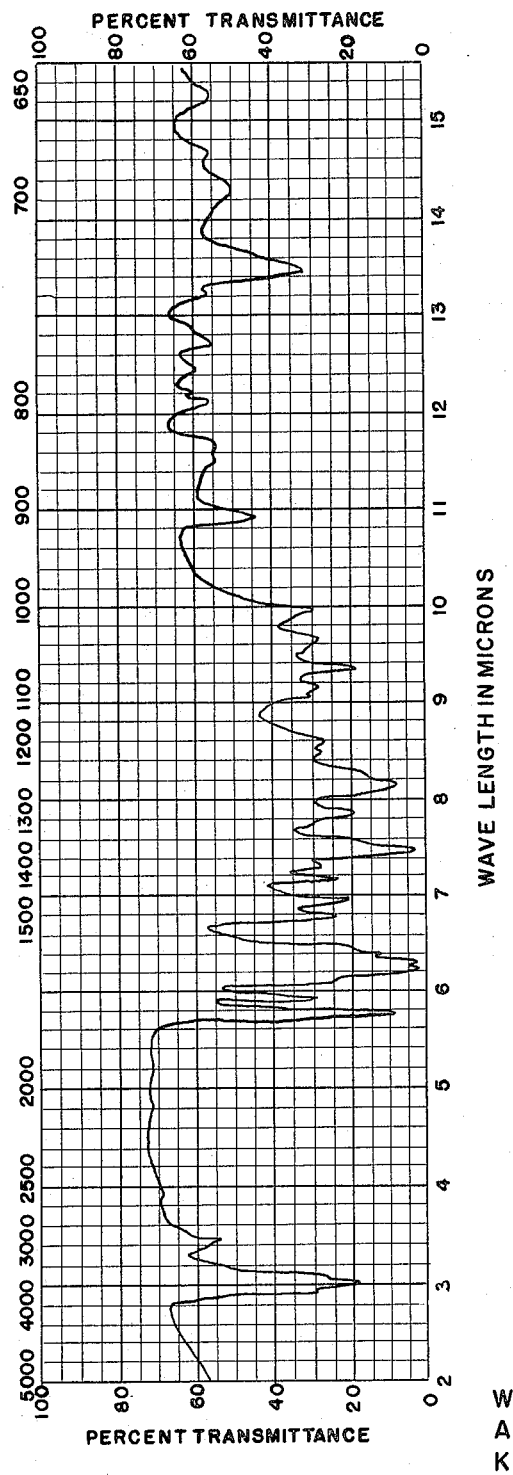

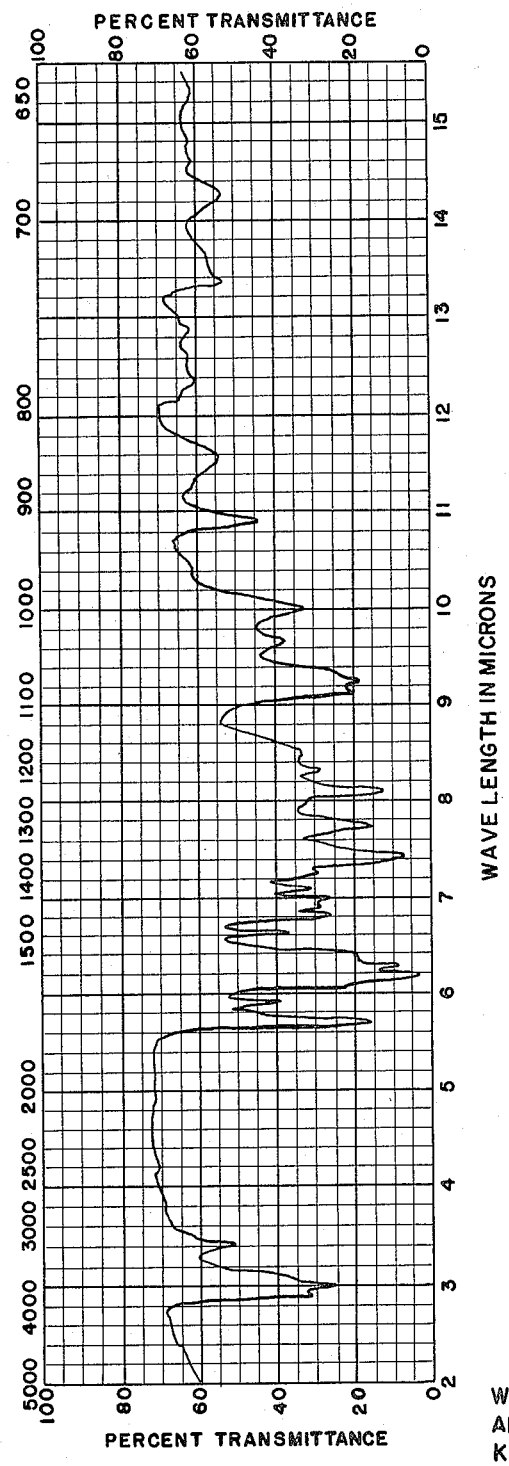

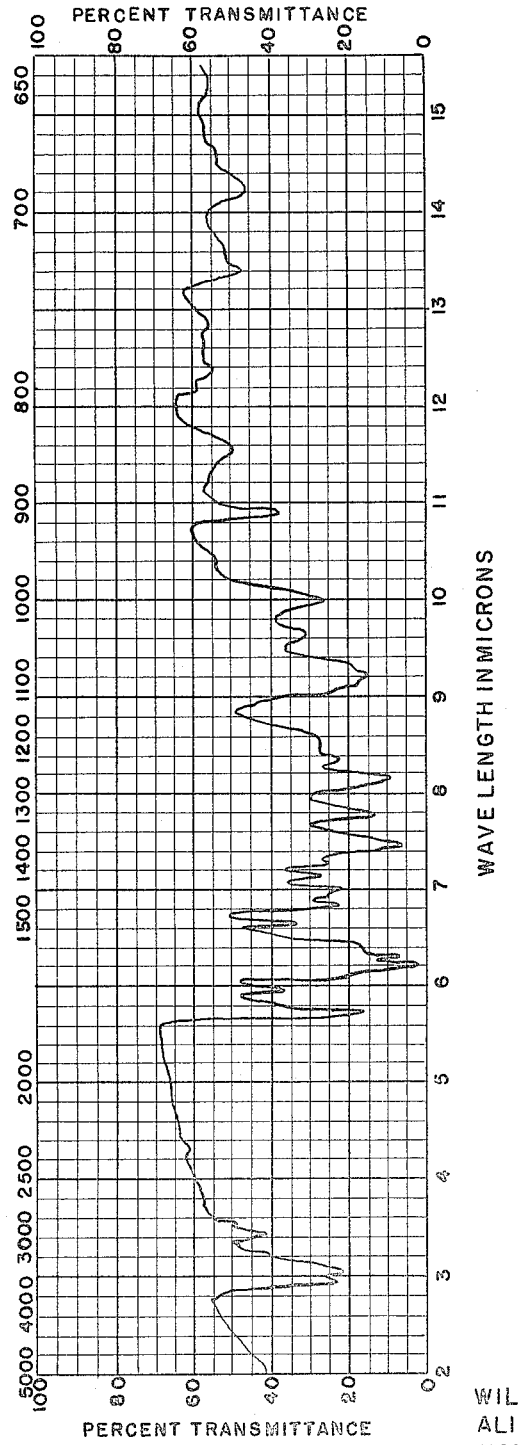

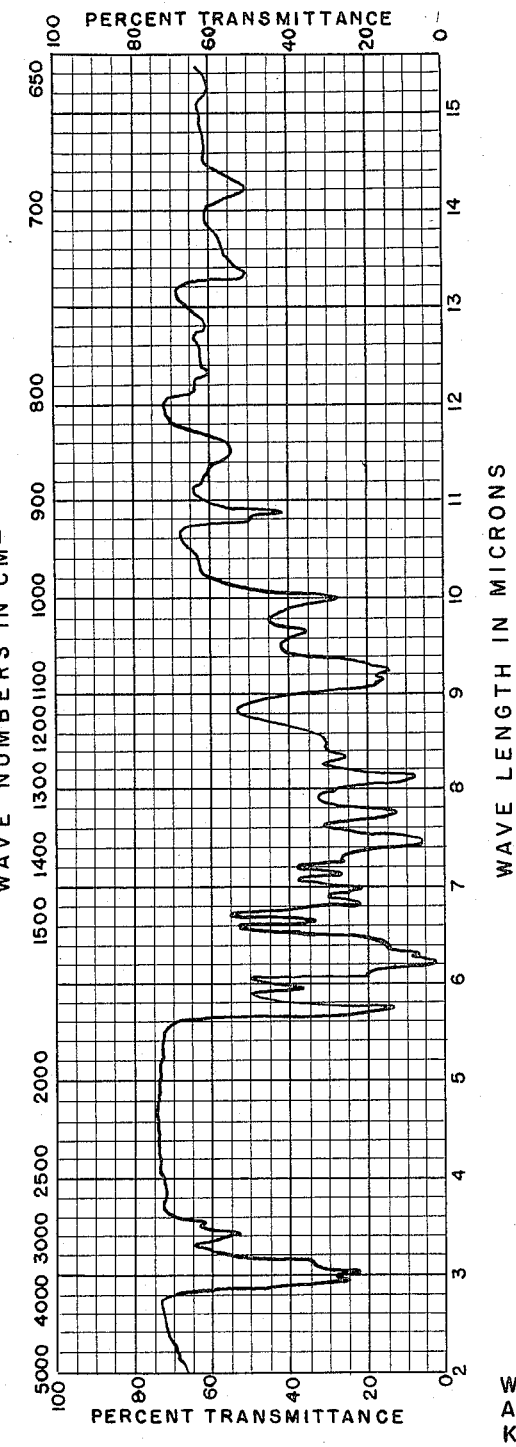

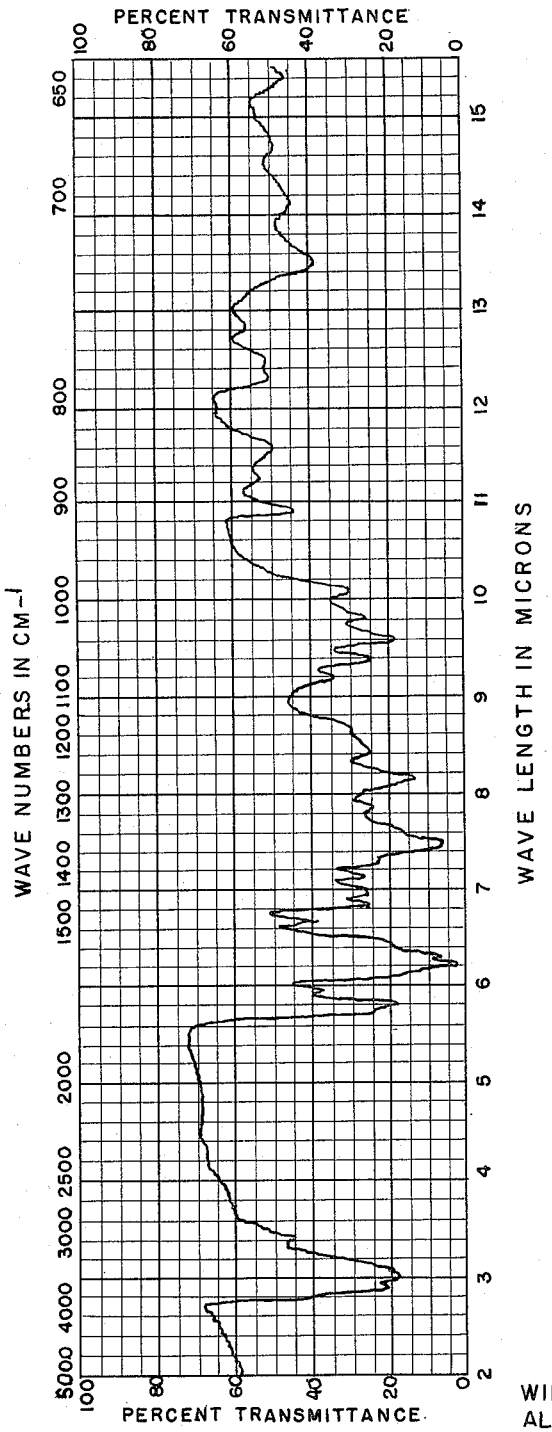

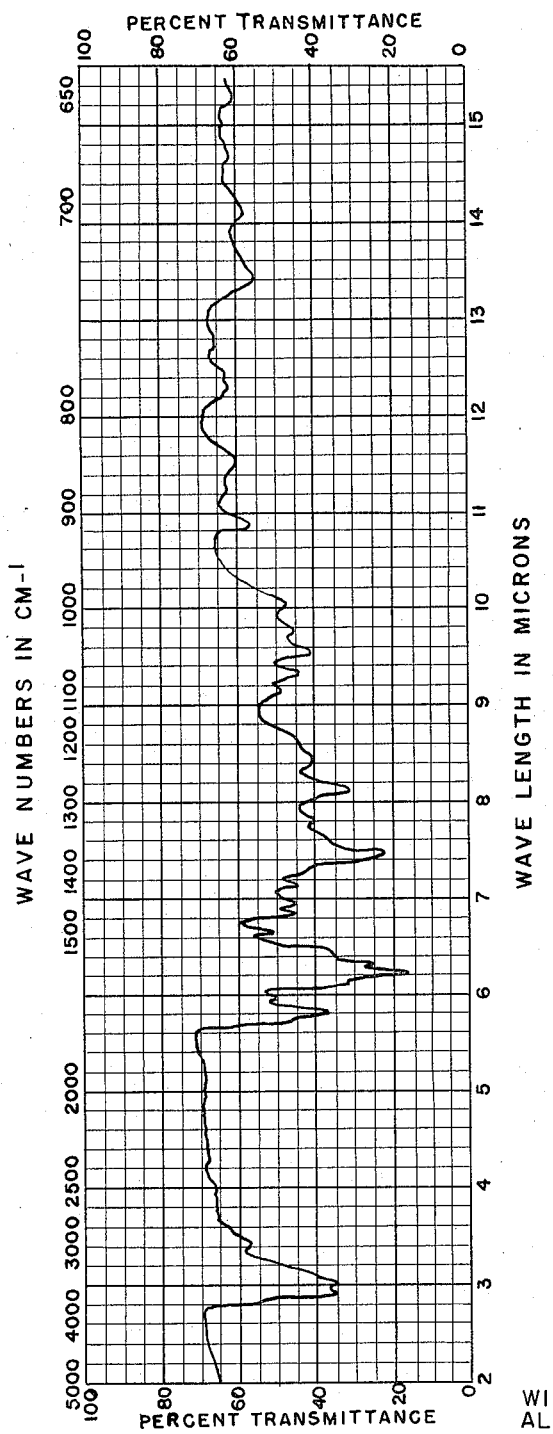

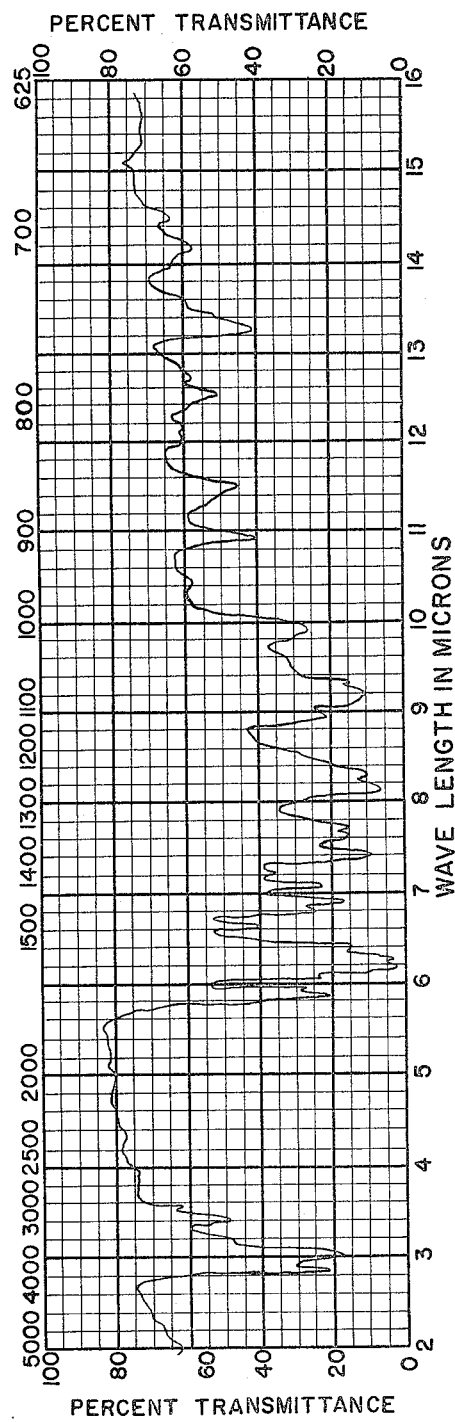

3,372,090
STREPTONIGRIN ANTIBIOTICS AND PROCESS FOR THEIR PRODUCTION
William S. Marsh, Wanaque, Aline L. Garretson, River Edge, and Koppaka V. Rao, Pinebrook, N.J., assignors to Chas. Pfizer & Co., Inc., New York, N.Y., a corporation of Delaware
Continuation-in-part of applications Ser. No. 753,967, Aug. 8, 1958, Ser. No. 823,469, June 29, 1959, Ser. No. 39,535, June 29, 1960, and Ser. No. 190,520, Apr. 17, 1962. This application July 5, 1963, Ser. No. 293,148
18 Claims. (Cl. 167—65)

This invention relates to the cultivation under controlled conditions of newly discovered strains of microorganisms, to the biologically active substances produced thereby, to the metal salts and other derivatives of these substances, and to methods for the recovery and concentration from crude solutions, including fermentation broths, of these biologically active substances, particularly of that substance hereinafter named streptonigrin. This application is a continuation-in-part of our earlier filed copending U.S. applications Ser. No. 753,967, filed Aug. 8, 1958, Ser. No. 823,469, filed June 29, 1959, Ser. No. 39,535, filed June 29, 1960, and Ser. No. 190,520, filed Apr. 17, 1962, all now abandoned.

This invention relates specifically to streptonigrin and to closely related substances, referred to generally herein as streptonigrins, in both their crude and purified forms, and to methods for the preparation, concentration, and isolation of these substances. These substances, strep-tonigrin in particular, are useful in inhibiting both Gram-positive and Gram-negative bacteria suiting them for a number of applications in therapeutics, veterinary medicine, industry, and agriculture. They are also useful as disinfecting agents, and for separating mixtures of microorganisms for medical, diagnostic and research purposes.

The accompanying drawings illustrate characteristic infrared absorption spectra of the various products of this invention, each measured in a potassium bromide pellet. FIGURE I is the spectrum of streptonigrin-F, FIGURES II and III are the spectra respectively of streptonigrin-A1 and A2, FIGURE IV shows the spectrum of streptonigrin per se, FIGURES V and VI show respectively the spectra of streptonigrin P-1 and P-2, and FIGURE VII illustrates the spectrum of the methyl ester of streptonigrin.

The newly discovered strains of microorganisms which produce streptonigrin and related compounds and which are employed in the valuable process of the present invention were isolated from soil samples on agar formulations.

Their identification in the culture collection of Chas. Pfizer & Co., Inc. and the numbers assigned to them by the American Type Culture Collection in Washington, D.C. where they have been deposited are given below:

Chas. Pfizer & Co., Inc.
identification: ATCC No.
Isolate X–13, *Streptomyces flocculus* _____ 13535
Isolate BA–163, *Streptomyces flocculus* ___ 13257
Isolate BA–4721, *Streptomyces flocculus* __ 13536
Isolate BA–13023, *Streptomyces bottropensis* 13854
Isolate BA–16986, *Streptomyces fungicidicus* 13853
Isolate BA–34885, *Streptomyces flocculus* __ 13852
Isolate BA–35182, *Streptomyces flocculus* __ 13851
Isolate BA–35412, *Streptomyces flocculus* __ 13850
Isolate BA–35599, *Streptomyces flocculus* __ 13859
Isolate BA–89818, *Streptomyces flocculus* __ 13855
Isolate BA–90792, *Streptomyces flocculus* __ 13860
Isolate BA–90796, *Streptomyces flocculus* __ 13857
Isolate BA–90926, *Streptomyces flocculus* __ 13861
Isolate BA–90930, *Streptomyces flocculus* __ 13862
Isolate BA–91124, *Streptomyces flocculus* __ 13858
Isolate BA–90744, *Streptomyces flocculus* __ 13856

TABLE I.—CULTURE CHARACTERISTICS OF *STREPTOMYCES FLOCCULUS*, ISOLATE BA-163

| Medium | Amount of Growth | Aerial Mycelium | Sporulation | Soluble Pigment | Remarks |
|---|---|---|---|---|---|
| Pridham's Yeast Extract | Good to excellent | Excellent | Poor | None | Spores borne in moderately long straight or wavy chains; sporophores produced singly or in pairs along hyphae; spores cylindrical, 0.65 x 1.00–1.30; formed by fragmentation; growth of individual colonies in three concentric circles; the other one flat, the two central ones raised, middle one forming a narrow collar, center one mealy and velvety; rare, small spirals may have been seen on yeast agar; strong disagreeable odor. |
| Skimed Milk | Good | Good; white | Lacking | Pink | Vegetative mycelium cream to pink; milk not coagulated, peptonized or hydrolyzed; no pH change. |
| Glucose Agar | do | Good; white to grey white | do | do | Vegetative mycelium not visible; reverse whitish; colonies similar to those on yeast extract; others with only a ring around central raised part or this may be lacking; colonies mealy, velvety. |
| Nutrient Agar | Moderate to good | Good; white | do | do | Vegetative mycelium not visible; reverse white. |
| Synthetic Agar | Almost lacking | | | | |
| Calcium Malate Agar | Moderate to good | do | do | do | Vegetative mycelium not visible; reverse white; malate not digested. |
| Starch Plates | Poor | Poor; white | do | do | Vegetative mycelium colorless; no hydrolysis. |
| Gelatin Plates | Moderate to good | Good; white | do | do | Vegetative mycelium tan; reverse tan; zone of liquefaction 1.2 cm. in diameter. |
| Cellulose | Very sparse; white growth | | | | |
| Potato Plugs | Moderate to good | do | do | do | Vegetative mycelium colorless where visible; reverse very pale yellow. |
| Dextrose-Nitrate Broth | Poor | Sparse; white | do | do | Vegetative mycelium colorless; nitrates reduced to nitrites. |
| Emerson Agar | Good | Good; white to yellow white | do | do | |
| Glucose-Asparagine Plates | Moderate | Good; white | do | do | Vegetative mycelium tan; reverse yellowish tan; colonies rather flat except for central, somewhat irregular columnar growth. |

Classification of the cultures was made by Dr. John B. Routien who supplied the following description.

The newly discovered microorganisms, X–13, BA–163 and BA–4721, were identified as new strains of *Streptomyces flocculus* (Duche). The appearance of the culture BA–163 which is described in Table I, after incubation on the media listed, agreed well with the description given in Bergey's Manual of Determinative Bacteriology, 7th Edition, but certain differences between the new strain and that described by J. Duche in Encyclopedia Mycologique 6:1–372 (1934) were noted.

Duche culture grew slowly while Isolate BA–163 grew well, in a mass but where individual colonies were observed, they were small. Other differences included the production of a rose-colored pigment in milk while Duche described only rose-colored growth and no pigment. Isolate BA-163 failed to produce peptonization of milk in two weeks. Slow peptonization was observed by Duche. Culture BA-4721 looked almost exactly like culture BA-163 and is considered to be the same species. It was different from culture BA-163 only in having numerous short, tight spirals.

Culture X-13 showed at first a number of differences from culture BA-163 and was thought to be either a variety of *S. flocculus* or perhaps a new species. Table II lists a comparison of culture X-13, as it first looked, with culture BA-163.

Cultures X-13 and BA-163 were studied for several months with especial attention to the shape of the chains of spores of the two. After the several transfers involved over this period of time cultures X-13 and BA-163 came to resemble each other more and more until finally they appeared to be nearly identical.

The changes were as follows: the biochemical and physiological properties of X-13 changed to resemble those of BA-163. Cultures BA-163 and X-13 both changed in regard to shape of the chains of spores. The straight or wavy chains of BA-163 nearly disappeared and came to be short chains in the form of curves or loops or with very small, tight spirals of one or two turns. X-13 in some areas had loops or imperfect spirals and in other areas tight spirals of one or two turns.

BA-91124—after seven days at 28° C. was similar in appearance to BA-90796.

BA-35599—after seven days at 28° C. had good growth, white aerial mycelium, reverse yellowish, no soluble pigment.

BA-90792—after seven days at 28° C. was similar in appearance to BA-35599 except that the reverse was yellow-brown.

BA-90926—after seven days at 28° C. was similar in appearance to BA-35599.

BA-90930—after seven days at 28° C. was similar in appearance to BA-90792.

The cultures BA-90930, BA-90926, BA-90792, BA-35599, BA-91124, BA-90796 and BA-89818 have all now been confirmed as strains of the species *Streptomyces flocculus*.

In the case of Isolates X-13, BA-163 and BA-4721, the original isolates were selected on the basis of their antagonism for *E. coli*, and the cultures were recognized as being unlike commonly encountered antibiotic producing species. Since they had the narrow hyphae and chains of spores typical of members of the genus Streptomyces, they were planted onto media commonly used for the identification of members of this genus. Final readings of the media were made after two weeks of incubation in the accepted fashion in the case of BA-163. In the case of BA-4721, and X-13, the cultures were compared with culture BA-163 by planting each side-by-side on identification media with BA-163.

TABLE II.—CULTURE CHARACTERISTICS OF *STREPTOMYCES FLOCCULUS* ISOLATE X-13

| Medium | Amount of Growth | Aerial Mycelium | Color | Soluble Pigment | Remarks |
| --- | --- | --- | --- | --- | --- |
| Pridham's Yeast Extract | | | | | Similar to BA-163 except for less aerial mycelium; spores formed in abundant, long loose spirals, singly, in pairs or small whirls; spores oval, 0.6 x 1.3, formed by fragmentation. |
| Skimmed Milk | | | | | Similar to BA-163 except less growth and of a darker shade; aerial mycelium pinkish-white. |
| Glucose Agar | Moderate | Moderate white | White | Lacking | Vegetative mycelium colorless to grayish; reverse cream to brownish, growth rather rough. |
| Nutrient Agar | | | | | Similar to BA-163 except spores white and sparse aerial mycelium. |
| Synthetic Agar | | | | | Similar to BA-163. |
| Calcium Malate Agar | Sparse | Sparse | White | Tannish | Vegetative mycelium cream to brownish; reverse white to tannish; malate somewhat digested. |
| Cellulose | No growth | | | | |
| Dextrose Nitrate Broth | | | | | Similar to BA-163. |
| Potato Plugs | | | | | Similar to BA-163 except for sparse aerial mycelium. |
| Emerson Agar | Moderate to good. | Good; white to pale gray. | Creamy gray. | Brown | Vegetative mycelium colorless where visible; reverse brown. |
| Glucose Asparagine Plates | | | | | Similar to BA-163 except for dark pinkish areas of vegetative mycelium. |
| Starch Plates | | | | | Similar to BA-163. |
| Gelatin Plates | | | | | Do. |

Cultures BA-34885, BA-35182 and BA-35412 were compared side-by-side with BA-163 and X-13. All looked very much like BA-163 and X-13 and showed no difference of any consequence.

It is concluded that all three cultures are representatives of the species *Streptomyces flocculus* to which BA-163 and X-13 have been assigned.

The remaining cultures are described as they appeared on Emerson's Agar:

BA-16986—after 14 days at 28° C. had good growth, gray to light gray aerial mycelium, reverse brownish-yellow and no soluble pigment. This organism has now been classified as a strain of *Streptomyces fungicidicus* group G, Okami, et al.

BA-13023—after seven days at 28° C. had good growth, white aerial mycelium, reverse yellow-brown, no soluble pigment. This organism has now been classified as a strain of *Streptomyces bottropensis* spiritus fabriek.

BA-89818—after seven days at 28° C. was similar in appearance to BA-13023 but had a lighter yellow reverse.

BA-90744—after seven days at 28° C. had good growth, grayish-white aerial mycelium, reverse light brown and soluble pigment brown.

BA-90796—after seven days at 28° C. was similar in appearance to BA-89818 except that the reverse was slightly lighter in color.

It is to be understood that for the production of the Streptonigrins according to the present invention, limitation to the aforesaid organisms is not intended. It is especially desired and intended to include mutants produced from these strains of these organisms by various means such as irradiation with X-rays or ultraviolet light, treatment with nitrogen mustards, single cell culture techniques, and the like.

We wish also to include any organism, regardless of its appearance or physiological behavior, that may be developed by means of transformation, transduction, genetic recombination or some other genetical procedure, using a nucleic acid or an equivalent material from the herein described species, whereby it has acquired the ability to produce the elaboration product here described or to carry on the biochemical change here described.

The streptonigrins are active as antibiotic agents and streptonigrin itself is an active antiprotozoal agent in vitro. The detailed antibacterial spectrum of streptonigrin is presented in Table III. Inhibition of a number of human pathogens of clinical importance at very low concentration is observed. Some of these organisms are *Corynebacterium diphtheriae*, *Clostridium perfringens*, *Salmonella typhosa*, a number of strains of *Proteus vulgaris*, and *Micrococcus pyogenes*, *Neisseria gonnorrhoeae*, and *Hemophilus influenzae*. Organisms of importance in agriculture, veterinary medicine, and industry which are sensitive to streptonigrin are *Listeria monocytogenes, Aerobacter aerogenes, Erwinia amylovora, Salmonella pullorum* and *Salmonella gallinarium,* etc.

TABLE III.—IN VITRO ANTIBACTERIAL SENSITIVITIES TO STREPTONIGRIN

| Microorganism: | Minimum inhibitory concentration (mcg./ml.) |
|---|---|
| *Micrococcus pyogenes* var. *aureus* | 0.39 |
| *Streptococcus pyogenes* | 1.56 |
| *Erysipelothrix rhusiopathiae* | 12.5 |
| *Corynebacterium diphtheriae* | 0.09 |
| *Listeria monocytogenes* | 50 |
| *Bacillus subtilis* | 0.09 |
| *Clostridium perfringens* | 0.09 |
| *Bacterium ammoniagenes* | 50 |
| *Aerobacter aerogenes* | 3.12 |
| *Escherichia coli* | 0.78 |
| *Escherichia coli* 21 | 6.25 |
| *Proteus vulgaris* | 6.25 |
| *Proteus vulgaris* 4 | 3.12 |
| *Proteus vulgaris* 1 | 6.25 |
| *Proteus vulgaris* 59 | 6.25 |
| *Salmonella pullorum* | 0.78 |
| *Salmonella gallinarium* | 12.5 |
| *Klebsiella pneumoniae* | 1.56 |
| *Neisseria gonnorrhoeae* | 25 |
| *Hemophilus influenzae* | 0.19 |
| *Shigella sonnei* | 1.56 |
| *Erwinia amylovora* | 12.5 |
| *Brucella bronchiseptica* | 1.56 |
| *Malleomyces mallei* | 12.5 |
| *Desulfovibrio desulfuricans* | 3.12 |
| *Vibrio comma* | 6.25 |
| *Pasteurella multocida* | 0.19 |
| *Candida albicans* | 25 |
| *Saccharomyces cerevisiae* | 50 |
| *Micrococcus pyogenes* var. *aureus* 376 | 0.78 |
| *Micrococcus pyogenes* var. *aureus* 400 | 0.39 |
| *Micrococcus pyogenes* var. *aureus* K3 | 1.56 |
| *Micrococcus pyogenes* var. *aureus* K4 | 0.78 |
| *Mycobacterium* 607 | 0.19 |
| *Mycobacterium berolinense* | 0.19 |
| *Aerobacter aerogenes* | 1.56 |
| *Pseudomonas aeruginosa* | 6.25 |
| *Salmonella typhosa* | 3.12 |

The antimicrobial activity of the other minor components produced along with streptonigrin is given in Table IV:

TABLE IV

| Microorganism | Minimum Inhibitory Concentration (mcg./ml.) | | | | |
|---|---|---|---|---|---|
| | SN | $A_1$ | $A_2$ | $P_1$ | $P_2$ |
| Staphylococcus aureus | 0.39 | 0.39 | 0.39 | 50 | 50 |
| Streptococcus pyogenes | 0.78 | 0.39 | 0.78 | 12.5 | 12.5 |
| Diplococcus pneumoniae | 0.19 | 0.39 | 0.78 | 12.5 | 12.5 |
| Staphylococcus aureus 376 | 0.19 | 0.19 | 0.19 | 25 | 25 |
| Streptococcus faecalis | 1.56 | 0.78 | 1.56 | 25 | 25 |
| Escherichia coli | 12.5 | 12.5 | 6.25 | 100 | 100 |
| Aerobacter aerogenes | 12.5 | 12.5 | 12.5 | 100 | 100 |
| Proteus vulgaris | 3.12 | 12.5 | 12.5 | 100 | 100 |
| Klebsiella pneumoniae | 3.12 | 12.5 | 6.25 | 100 | 100 |
| Salmonella typhosa | 6.25 | 12.5 | 12.5 | 100 | 6.25 |

SN-F has activity similar to streptonigrin on plates and for this reason, a tube dilution test was not run.

The SN designation used herein represents streptonigrin. SN-F indicates the forecut product which precedes streptonigrin on elution from the chromatographic columns, diethylamninoethylcellulose or silicic acid-cellulose (2:1); the two fractions which follow the major band of streptonigrin are termed SN-$P_2$ and SN-$P_1$ (streptonigrin postcuts). The two presumably anomalous bands obtained by chromatographic separation of a crude concentrate are termed SN-$A_1$ and SN-$A_2$.

The streptonigrins are remarkably effective in treating a number of different types of infections. For this purpose, either the pure crystalline materials may be administered or one of the crude forms of the valuable products may be employed. This includes either a filtered fermentation broth prepared from *Streptomyces flocculus* ATCC Nos. 13257, 13535, 13536, 13850, 13851, 13852, 13855, 13857, 13858, 13859, 13860, 13861, 13862, *Streptomyces fungicidicus* ATCC 13853, *Streptomyces bottropensis* ATCC 13854 or a solid or liquid concentrate obtained therefrom. Such preparations should be of sufficient potency to provide a daily dose to a lower animal host equivalent to at least about 50–500 mcg./kg. of body weight. In order to do this, a concentration of the active ingredient in the carrier of at least about 0.0001% is necessary. For administration to animals, a non-toxic carrier of course, is selected. By non-toxic is meant a carrier which is non-toxic when administered in a quantity sufficient to provide the above dose of the particular streptonigrin. This may be either a pharmaceutical carrier, either a liquid or a solid such as water, aqueous ethanol, syrup, isotonic saline or glucose, starch, lactose, calcium phosphate, etc., an animal feed stuff, or a mixture of various materials as occurs in a filtered fermentation broth. Either oral or parenteral administration is satisfactory. The parenteral route is perhaps preferred until a satisfactory regimen adapted to the patient is developed.

The present invention embraces the process for growing *Streptomyces flocculus* ATCC Nos. 13257, 13535, 13536, 13850, 13851, 13852, 13855, 13857, 13858, 13859, 13860, 13861, 13862, *Streptomyces fungicidicus* ATCC 13853, *Streptomyces bottropensis* ATCC 13854 and Isolate BA–90744 under controlled conditions to produce the streptonigrins. Biologically active filtrates are satisfactorily prepared, for instance, using an aqueous nutrient medium containing 10 g./l. of glucose, 15 g./l. soybean meal, 5.0 g./l. corn meal, 2.5 g./l. distiller's solubles, and 2.0 g./l. of calcium carbonate. This broth is adjusted to pH 7.0 before autoclaving. Inocula may be either spore suspensions or preformed growth of the organism. Fermentation is carried out at 28° C. either by shake culture or small pot fermentations, mechanically aerated, for from about 60 to 80 hours. Progress of the fermentation is followed by standard plate assay methods using either *B. subtilis*, Staph. aureus, No. 376, or *E. coli* No. 21 as the assay organism.

A wide variety of fermentation media have been tested and found to be satisfactory. A medium composed basically of a source of nitrogen, of a carbohydrate, and of minerals is required. Satisfactory nitrogen sources include myriad proteinaceous materials such as hydrolyzed casein of various types, soybean meal, casein, distiller's solubles, corn meal, etc. Suitable carbohydrate sources are dextrose, glycerol, dextrin, starch, etc. Less satisfactory results are obtained on lactose-corn steep mixtures. The preceding materials frequently contain sufficient minerals to satisfy the mineral requirements of the organism without the addition of substantial additional mineral components.

After a satisfactory level of antibiotic activity is attained, following a 60–80 hour fermentation, the beer is filtered employing from 3–5% by weight of a diatomaceous filter aid. The antibiotic content of the filtered broth may be extracted therefrom with a water immiscible organic solvent such as preferably n-butanol, methyl isobutyl ketone, or ethyl acetate, or somewhat less satisfactorily with ether, benzene, toluene, methylene chloride, chloroform, or carbon tetrachloride. Approximately 30% of the total antibiotic activity remains in the mycelial cake when beer filtration is carried out at pH 4.0. This portion is readily recovered by extraction of the cake with a lower alkanol such as methanol, ethanol, or isopropanol.

It is preferred, when employing solvent extraction for the recovery of the streptonigrins from fermentation broths, to first adjust the broths to a neutral or slightly acidic pH. The range of from about pH 3.5 to 7.2 is prefered. Extraction is relatively more rapid and complete at pH 3.5 than at pH 7.2.

As indicated previously, more than one antibiotically active substance is produced during fermentation of *Streptomyces flocculus* ATCC Nos. 13257, 13535, 13536, 13850, 13851, 13852, 13855, 13857, 13858, 13859, 13860, 13861, 13862, *Streptomyces fungicidious* ATCC 13853, *Streptomyces bottropensis* ATCC 13854 and Isolate BA-90744. When ethyl acetate or n-butanol is used as the extracting solvent, the extract is clarified and concentrated under reduced pressure to 1/50 volume. The mycelial cake is extracted with a 1:4 mixture of 0.3% phosphate buffer (pH 4.0) and ethyl acetate for several hours. The extract is concentrated and added to the concentrate from the broth. The combined concentrate is treated with four to five times its volume of ligroin or isopropyl ether, the bulk of the active material is extracted from the organic solvent mixture by shaking with successive portions of a phosphate buffer (pH 7.5) until a fresh portion of buffer extract turns only a light brown. A significant amount of activity, however, remains in the organic layer. The substance responsible for this activity appears to be a different but closely related antibiotic which is somewhat less acidic in character than streptonigrin.

The aqueous layer is extracted with ½ volume of isopropylether and the organic phase discarded. The aqueous phase is adjusted to pH 4.0 and extracted with chloroform. On concentration of the chloroform phase, crystals of the streptonigrin complex (I), 80–90% purity, are obtained.

The various components are separated by column chromatography on diethylaminoethylcellulose or silicic acid-cellulose or by countercurrent distribution in the system ethyl acetate-3% phosphate buffer, pH 7.5. The products are recrystallized from pyridine-ethanol solution or from acetone-ethylacetate: (1:4 in each instance). The pure products are brown or red-brown in color.

When using a diethylaminoethylcellulose column (10–20 g. per gram of sample), the crystalline sample, (I) dissolved in a 1:3 pyridine:methanol solution, is added to the column and developed first with methanol and then with methanol containing increasing amounts of 1% acetic acid. A minor component (SN–F) appears first followed by the major component, streptonigrin (SN), and then two additional minor components (SN–P$_1$ and SN–P$_2$).

Alternatively, and preferably, a column prepared from a 2:1 mixture of silicic acid and cellulose in chloroform is used, and a chloroform solution of the sample (I) run through the column which is developed with chloroform. Here also, a minor component precedes the major streptonigrin component. Further washing of the column with chloroform containing increasing amounts of ethyl acetate produces at least two additional minor components. However, when product I is obtained in non-crystalline form and run through a silicic acid-cellulose column as described above, two anomalous streptonigrin-like components (SN–A$_1$ and SN–A$_2$) are obtained. These components appear almost identical with respect to ultraviolet extinction $$(E_{1\,cm.}^{1\%}\ \text{values})$$

infrared spectra, melting point and microbiological activity. A mixture of the two components with streptonigrin fails to separate on passage through another silicic acid-cellulose column. It appears that the separation may have been due to some carrier substance in the crude concentrate.

An alternative work-up procedure consists in filtering the broth, adjusting to pH 4.0 and stirring the filtrate with 1–2% (by volume of fuller's earth) for 30 minutes. The slurry is filtered with the aid of Supercel (a diatomaceous earth filter aid) the cake washed with water and extracted twice with methanol, acetone or ethyl acetate. The combined extracts are concentrated to small volume and processed as described above. The mycelial cake is extracted separately as described above. The combined extracts, more correctly the concentrates of the combined extracts, are processed together.

Streptonigrin, a complex structure comprising three ring systems: quinonoid, pyridine and benzenoid, has the formula:

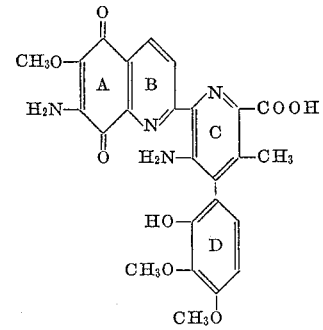

Its systematic name is 5-amino-6-(6-methoxy-5,8-dihydro-7-amino-5,8-dioxo - 2 - quinolyl) - 4 - (2 - hydroxy-3,4-dimethoxyphenyl)-3-methylpicolinic acid. It is an acidic substance which behaves as a weak monobasic acid. Potentiometric titration in dioxane above shows an apparent pK$_a$ value of 6.3–6.5. Its composition, determined by averaging the values of several microanalyses on crystalline streptonigrin, is 59.11% C; 4.48% H; 10.69% N; 18.35% methoxyl 25.72% oxygen (by difference). Group analyses indicate three methoxyl groups and one C-methyl group. These data, when considered in conjunction with studies on derivatives of streptonigrin including degradation products, especially nuclear magnetic resonance and mass spectral data, show the molecular formula to be C$_{25}$H$_{22}$O$_8$N$_4$. Pure crystalline streptonigrin is dark maroon to black in color and crystallizes from acetone-ethyl acetate (1:5) as thin elongated rhombohedral plates. Individual crystals of the substance appear to be orange when viewed through a microscope using transmitted light. The crystalline form and, to some extent, the color depend on the nature of the crystallizing solvent. For example, chloroform and ethyl acetate produce brown rectangular plates; aqueous acetone produces long, pale brown needles, and from tetrahydrofuran bright reddish brown rectangular plates separate. On slow heating, streptonigrin begins to darken at 268° C. and melts with decomposition at 272–275° C. On rapid heating it darkens at 272° C. and melts at 275–277° C. with decomposition. It exhibits absorption maxima at the following wave lengths in the infrared region of the spectrum when measured in a KBr pellet containing 1% of the product: 3448, 3400, 3356, 3300, 3268, 2900, 2800, 2739, 1675, 1631, 1605, 1580, 1560, 1500, 1460, 1432, 1425, 1400, 1370, 1334, 1285, 1225, 1196, 1170, 1094, 1084, 1033, 1000, 956, 916, 866, 821, 810, 778, 748 and 704 cm.$^{-1}$. The curve is more particularly illustrated in FIGURE IV. When the pure crystalline substance is dissolved in methanol at a concentration of 1%, absorption maxima in the ultraviolet region of the spectrum appear at 245 mu, E=45,000; 375 mu, E=19,500.

Streptonigrin is only slightly soluble in water at neutral and acidic pH's. Its acidic character is reflected by its relatively greater solubility in aqueous sodium bicarbonate or in buffers of pH 7.0 or higher. In addition, the substance appears to be unstable at alkaline pH values. In aqueous sodium hydroxide, for example, it dissolves to form a deep greenish yellow solution which changes to brown or red-brown with evolution of ammonia. It is very slightly soluble in ether, benzene, and methylene chloride, and moderately soluble in ethyl acetate, the lower alkanols from methanol to butanol, and acetone. It dissolves in concentrated sulfuric acid to give a bright yellow solution. Alcoholic ferric chloride test solution turns a dark greenish-brown color when streptonigrin is dissolved in it. Its reddish brown aqueous solution changes to a bright yellow color when treated with sodium bisulfite. When this yellow bisulfite solution is shaken with water immiscible solvents in which streptonigrin is soluble, such as ethylacetate or chloroform, the extract becomes reddish-brown and contains an antibiotically active solute. These properties and reactions are attributed to the quinone type structure. Since streptonigrin is an acidic substance, it forms salts with basic substances such as metal hydroxides, basic metal salts, ammonia, hydrazine, amines such as mono-, di- and trialkylamines, alkanolamines, ethylenediamine and its N-substituted derivatives, etc. The streptonigrin salts of the alkali and alkaline earth metals such as sodium, potassium, lithium, calcium, magnesium, etc., are convenient dosage forms due to their solubility. The acid character is further borne out by the esterification and amidation (including with hydrazine) of streptonigrin. Treatment with a slight excess of diazomethane in ether or with methyl alcohol and an acid catalyst, such as mineral acids, the hydrogen form of Dowex 50 (an ion exchange resin which is a copolymer of sulfonated polystyrene and divinylbenzene) or aromatic sulfonic acids, gives the monomethyl ester. Its composition, determined by microanalysis, is C, 59.88%; H, 4.75%; N, 10.51%; O, 24.86% and methoxyl 23.77% in agreement with the formula $C_{26}H_{24}O_8N_4$. Reaction with dimethylsulfate produces the same compound. Higher alkyl esters are prepared by substitution of the appropriate alcohol for methyl alcohol. Further methylation of the monomethylester with dimethylsulfate produces dimethyl streptonigrin, an ether ester, having the formula $C_{27}H_{26}O_8N_4$. Saponification of the dimethyl derivative with sodium hydrosulfite gives a monomethyl compound, an ether, which is isomeric with the methyl ester. The product is weakly acidic and forms a dark greenish brown color with ferric chloride. These methylation reactions thus indicate the presence of a phenolic group and a possible carboxyl group in streptonigrin. The remaining components produced with streptonigrin likewise form esters and salts; and exhibit the same solubility characteristics and color reactions as does streptonigrin. The red-brown chloroform and ethyl acetate extracts of their bisulfite treated solutions are antibiotically active.

The methyl ester of streptonigrin, a neutral, dark brown crystalline compound; M.P. 270–275° C. (dec.), is only slightly soluble in water and the common organic solvents such as lower alcohols, ethyl acetate and acetone and insoluble in aqueous sodium bicarbonate. It does not produce a color with alcoholic ferric chloride. Its infrared spectrum, measured in a KBr pellet containing 1% of the product (FIGURE VII), bears a strong resemblance to that of streptonigrin. Absorption maxima occur at 3472, 3322, 2933, 2841, 1715, 1689, 1610, 1595, 1555, 1513, 1471, 1443, 1410, 1383, 1351, 1311, 1294, 1230, 1205, 1116, 1089, 1076, 915, 868, 801, 754 reciprocal centimeters. Its ultraviolet spectrum is very similar to that of streptonigrin: absorption maxima at 245 and 375 mμ with E=43,000 and 19,500 respectively.

Amide or hydrazide formation at the carboxy group according to standard methods produces derivatives. Prolonged treatment (2 days) of a dioxane solution of the methyl ester of streptonigrin with hydrazine hydrate at room temperature produces streptonigrin hydrazide. This product crystallizes from chloroform-methanol (1–1) as a dark brown, crystalline solid; M.P. 275–800° C. (dec.).

Further evidence for a quinonoid structure is based upon the ready reduction of streptonigrin by sodium dithionite, lithium aluminum hydride or hydrogen in the presence of palladium. In each case a yellow, unstable dihydro derivative which is readily reoxidized to streptonigrin by air is obtained. Reductive acetylation with acetic anhydride, sodium acetate, platinum and hydrogen yields a yellow crystalline solid which analyzes for $C_{31}H_{30}O_{11}N_4$ in agreement with a triacetyl derivative of dihydrostreptonigrin. The product, an acidic substance, $pK_a=4.3–4.5$, is soluble in aqueous sodium bicarbonate and gives a positive ferric chloride test.

Gentle treatment of streptonigrin with aqueous alkali produces desaminostreptonigrin, a brick-red crystalline solid apparently formed by exchange of an amino group by a hydroxy group. This product melts at 270°–275° C. (dec.) and contains the elements carbon, hydrogen, nitrogen and oxygen in the following proportions by weight: C, 58.0; H, 4.30; N, 8.0; O, 29.7; (by difference); methoxyl, 17.70; C—CH$_3$, 2.75; ($C_{25}H_{21}O_9N_3$). It is a dibasic acid with $pK_a=4.8$ and 6.7 and an equivalent weight of 250–260. Methylation with methanolic acid yields a monomethyl derivative ($C_{27}H_{23}O_9N_3$) while diazomethane gives a dimethyl derivative ($C_{27}H_{25}O_9N_3$) which is neutral and gives no ferric chloride reaction.

Acetylation of streptonigrin produces a variety of products depending upon the conditions used. Acetylation at room temperature with acetic anhydride and pyridine produces at least two isomeric monoacetylated derivatives of formula $C_{27}H_{26}O_9N_4$. Acetate I, an O-acetyl derivative, is obtained as deep brown rectangular plates on crystallization from pyridine-ethanol; M.P. 120°–212° C. It is weakly acidic ($pK_a=6.1–6.3$ in 50% aqueous dioxan) and its infrared spectrum is very similar to that of streptonigrin, Acetate II, an N-acetyl derivative is obtained as brownish-pink needles from pyridine-ethanol; M.P. 237°–239° C. It is a stronger acid ($pK_a=4.3–4.5$) than the O-acetyl isomer. The O-acetyl derivative is considerably more active as an antitumor agent than the N-isomer. Acetylation with acetic anhydride and an acid catalyst, such as boron trifluoride, sulfuric or perchloric acid produces a yellow, crystalline new quinonoid tetraacetyl derivative; M.P. 206°–208° C. having the formula

$$C_{33}H_{32}O_{13}N_4$$

It is a strong acid ($pK_a=4.3–4.5$), soluble in aqueous sodium bicarbonate and gives a positive ferric chloride test.

Although the dark color of streptonigrin makes it difficult to demonstrate optical activity, some of its less colored derivatives have been found to be optically active.

For the commercial production of streptonigrin, submerged culture in the usual type of equipment familiar to those skilled in the art is employed. Suitable tanks vary in size from 2000 gal. to 20,000 gal. or more and are equipped with efficient agitators and means for aseptic aeration of the contents with up to two or more volumes of air per minute. A satisfactory medium for large scale production is given above. The growth of the microorganism and antibiotic production usually reaches its maximum, as measured by one of the above assay methods, after about 60 to 80 hours at 28° C. However, variation in the equipment used, the rate of aeration, stirring, and so forth frequently affect the time period for maximum activity to be reached. A period of at least about 24 hours is required in any case. Aeration of the medium on submerged growth is maintained at the rate of about ½ to 2 volumes of air per volume of broth per minute. Aseptic conditions, of course, must be maintained throughout the transfer of the inoculum, and the growth of the microorganism. Removal of the mycelium and recovery of the antibiotic is carried out as described above.

Streptonigrin and its alkyl esters are somewhat toxic materials. However, therapeutic doses can be administered without substantial adverse effect. This is illustrated by the data in Table VII. Swiss white mice where given five consecutive daily injections of 1 cc. aqueous solutions or suspensions containing the dosages of streptonigrin and its methyl ester, respectively, listed, and survival rates noted.

TABLE V.—TOXICITY OF STREPTONIGRIN AND ITS METHYL ESTER

| Streptonigrin | | Methyl Ester | |
| --- | --- | --- | --- |
| Dosage | Survival Rate | Dosage | Survival Rate |
| 0.75 mg./kg. | 3/6 | 20 mg./kg. | 0/3 |
| 0.50 mg./kg. | 5/6 | 15 mg./kg. | 2/3 |
| 0.375 mg./kg. | 6/6 | 10 mg./kg. | 2/3 |
| Untreated Control | 6/6 | | |

The following examples are helpful to further illustrate the invention in detail. They are not, however, the sole embodiments, and are not considered to limit the scope thereof in any way.

EXAMPLE I

A nutrient medium having the following composition is prepared, adjusted to pH 7.0, and sterilized: Glucose 10 g./l.; Soybean meal 15 g./l.; distiller's solubles 2.5 g./l.; dipotassium phosphate 5.0 g./l.; sodium chloride 2.0 g./l.; calcium carbonate 2.0 g./l.; tapwater to volume. Inoculum is prepared by transferring the growth of a well sporulated slant of Streptomyces flocculus Isolate BA-163 to a portion of this medium and incubating for about 36 to 40 hours at 28° C. on a rotary shaker. The main batch of medium is then inoculated by mixing with 5% by volume of the inoculum so prepared. Aeration is effected at a rate of about 2 volumes of air per minute and efficient agitation is provided during incubation at 26-30° C. Progress of the fermentation is followed by plate assay of the filtered broth at intervals employing Staph. aureus No. 376 and E. coli No. 21 as the assay organisms. Typical zones of inhibition of harvestable broth are 27.0 mm. and 21.0 mm. respectively.

EXAMPLE II

A fermentation broth is prepared as described in Example I and clarified by filtration employing from about 3 to 5% by weight of a diatomaceous earth filter-aid. The filtrate is then adjusted to pH 4.0 and extracted with ⅓ volume of ethyl acetate. The ethyl acetate extract is then filtered to free it of insoluble extraneous matter, and concentrated, at 25-30° C. under reduced pressure, to a small volume. Approximately 30% of the antibiotic activity produced remains in the mycelial cake. This is recovered by stirring the wet-cake with methanol, filtering, and concentrating the aqueous methanol extract until most of the methanol has evaporated therefrom. This concentrate is then adjusted to pH 4.0 and extracted with approximately an equal volume of ethyl acetate. The two ethyl acetate concentrates are then combined and treated with five volumes of isopropyl ether. This solution is then shaken several times with a pH 7.5 phosphate buffer until the last extract is only a light brown in color. The combined aqueous buffer extract is then adjusted to pH 4.0 and extracted several times with methylene chloride. Concentration of the methylene chloride extract and cautious treatment of the concentrate with ether results in the precipitation of impure streptonigrin as thin elongated rhombohedral plates, dark maroon to black in color.

Column chromatography of this material according to the procedure of Example III brings about separation and purification of streptonigrin and the fractions SN-F, SN-$P_1$ and SN-$P_2$.

EXAMPLE III

A fermentation broth is prepared as in Example I using S. flocculus, Isolate BA-34885 in place of S. flocculus, Isolate BA-163. The beer is filtered, the broth adjusted to pH 4.0 and extracted with ½ volume of n-butanol. The extract is clarified and concentrated to 1/50 of the original volume. The mycelial cake is extracted with 1:4 mixture of 3% phosphate buffer, pH 4.0, and ethyl acetate for several hours. The extract is concentrated and added to the concentrate from the broth.

The concentrate is processed further as shown in the following scheme.

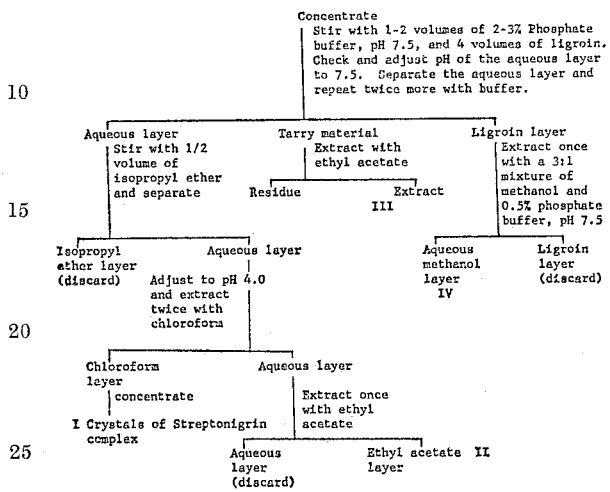

Flow Sheet for the Recovery of Streptonigrin Complex

The crystals from (I) contain the bulk of the active material from the concentrate. The product is 80-90% pure as streptonigrin. The mother liquors from the crystals are added to IV and processed further. Likewise, II and III are combined and worked up together.

The various components are separated and purified by chromatography on a column prepared from a 2:1 mixture of silicic acid and cellulose in chloroform. The crystalline sample (I) is dissolved in chloroform, added to the column and developed with more of the same solvent. After the main band is eluted, the column is washed with chloroform containing increasing amounts of ethyl acetate: 10, 25 and 50%. The following activity distribution is observed. A minor band 1-2% (SN-F), major band 80% (streptonigrin), two minor bands 3-5% each (SN-$P_1$, SN-$P_2$).

The properties of the various components are summarized below:

| Compound | Ultraviolet Spectra | | | |
| --- | --- | --- | --- | --- |
| | $\gamma$ Max. | $E^{1\%}_{1\,cm.}$ | $\gamma$ Max. | $E^{1\%}_{1\,cm.}$ |
| SN-F | 245 m$\mu$ | 850 | 375-380 m$\mu$ | 370 |
| SN | 245 m$\mu$ | 825 | 375-380 m$\mu$ | 350 |
| SN-$P_1$ | Shoulder | 700 | 375-380 m$\mu$ | 340 |
| SN-$P_2$ | 245 m$\mu$ | 800 | 375-380 m$\mu$ | 356 |

| Compound | Melting Points, ° C. | Analysis | | |
| --- | --- | --- | --- | --- |
| | | C | H | N |
| SN-F | 185-187 (dec.) | 60.54 | 4.36 | 11.42 |
| SN* | 272-275 (dec.) | 59.11 | 4.48 | 10.69 |
| SN-$P_1$ | 190-197 (dec.) | 57.97 | 4.72 | 11.02 |
| SN-$P_2$ | 187-195 (dec.) | 58.12 | 4.50 | 10.60 |

*The product, actually obtained as a hemihydrate (C, 58.20%; H, 4.56%; N, 10.79%), is dried at 150° C. in vacuo to give the anhydrous form.

The various components are readily purified by recrystallization from pyridine-ethanol solution.

The infrared spectra of the components when measured in KBr pellets containing 0.3% of the product exhibit absorption maxima at (in reciprocal centimeters):

Fraction IV and the combined fractions II and III, which are richer in the minor components, are worked up in like manner to give additional quantities of the various components.

EXAMPLE IV

The procedure of Example III is repeated. However, the fraction I, which contains some oily material (apparently not removed by extraction), is not obtained in crystalline form and, on running through the silicic acid-cellulose column, produces five bands having the following distribution:

| Band | Percent |
| --- | --- |
| 1 | 10 |
| 2 | 10 |
| 3 | 70 |
| 4 | 5 |
| 5 | 5 |

When each of these is isolated and purified, bands 1 (SN–A$_1$), 2 (SN–A$_2$), and 3 (streptonigrin) show almost identical properties such as ultraviolet extinctions, infrared spectra, microbiological activity and melting point. A mixture of the three purified materials fails to separate on another silicic acid column. It appears that these may have been separated due to some type of carrier substances in the crude concentrate. The properties of the two apparently anomalous substances and of Streptonigrin are compared below. Bands 4 and 5 seem to be genuine. They have much lower activity on bacteria and are more polar.

| Component | UV Spectra | | Analysis | | |
| --- | --- | --- | --- | --- | --- |
| | γ max. | $E^{1\%}_{1cm}$ | M.P. (° C.) | C | H | H |
| SN–A$_1$ | 245 mµ / 375–380 mµ | 840 / 355 | 268–275 (dec.) | 58.69 | 4.61 | 11.00 |
| SN–A$_2$ | 245 mµ / 375–380 mµ | 830 | 270–275 (dec.) | 59.12 | 4.67 | 10.55 |
| SN | 245 mµ / 375–380 mµ | 825 / 350 | 272–275 (dec.) | 58.20 | 4.56 | 10.79 |

The infrared spectra of these apparently anomalous substance when measured in KBr pellets containing 0.3% of the product exhibit absorption maxima at (in reciprocal centimeters):

SN–A$_1$ (FIG. II).—3420, 3300, 3220, 2900, 2810, 1740, 1675, 1630, 1608, 1580, 1560, 1550, 1460, 1440, 1425, 1400, 1370, 1338, 1285, 1221, 1196, 1170, 1096, 1082, 1070, 1032, 998, 915, 866, 822, 810, 796, 777, 747, 732, 704.

SN–A$_2$ (FIG. III).—3400, 3300, 2900, 2810, 1740, 1673, 1630, 1610, 1580, 1500, 1460, 1435, 1426, 1400, 1338, 1288, 1225, 1195, 1170, 1092, 1080, 1070, 1035, 998, 918, 866, 822, 808, 777, 747, 703, 683.

EXAMPLE V

A fermentation broth prepared as described in Example I is filtered, adjusted to pH 4.0 and extracted once with ½ volume on n-butanol. The extract is concentrated azeotropically under reduced pressure (35° C.) to remove most of the butanol. The concentrate is shaken with ethyl acetate twice to transfer all the active material into the organic solvent. This extract is concentrated to small volume and stirred with 2 volumes of 3% phosphate buffer, pH 7.6. To this vigorously stirred mixture is added 5–10 volumes of ligroin (B.P. 60–90° C.). The aqueous layer is separated and the solvent layer extracted twice more with isopropyl ether to remove adhering oily impurities and separated. The buffer layer is then acidified to pH 4.0 and extracted twice with ½ volume of chloroform. The aqueous residue is finally extracted once with ½ volume of ethyl acetate.

The mycelial cake is extracted twice with sufficient ethyl acetate to give a thin slurry in the presence of ⅛ volume (based on the ethyl acetate) of a 5% solution of phosphate buffer, pH 4.0. The two solvent extracts are combined, concentrated to a small volume and added to the chloroform extract from the broth. The mycelial extract provides about 20–30% more of the active material.

The various components are separated by chromatography on a column of silicic acid and cellulose powder. A mixture of 2 parts of silicic acid (Mallinkrodt, 100 mesh) and one part of cellulose powder (Solcafloc, Brown & Co., Berlin, N.H.) is made into a slurry with chloroform and poured into a column. About 25 g. of this mixture is suitable per gram of the substance. The sample, dissolved in chloroform is added to the column which is then developed with chloroform. The bands which move with this solvent are eluted off the column. The solvent is progressively changed to 10, 25 and 50% ethyl acetate in chloroform. The products are recovered by evaporation.

In general the elution pattern of the components is as follows: A minor component the most solvent-soluble, is obtained just behind the solvent front. Then comes the major component streptonigrin, which accounts for almost 75% of the total mixture. Next there are at least two minor components eluted chiefly when 10% ethyl acetate in chloroform is used. In order to keep the name of streptonigrin unchanged for the major component the following designation is adopted for the minor components. The component that appears before the major band is designated by the letter F (for fore cut); and the fractions that follow the major band by the letter P (P$_1$, P$_2$ for post cuts).

EXAMPLE VI

The streptonigrin complex (I) produced as described in Example III, is purified by passage through a column of diethylaminoethylcellulose in methanol (15 g. per gram of sample). The sample (I) dissolved in pyridine-methanol (1:3) is added to the column and development carried out with 0.1% acetic acid in methanol. The order of bands observed here is the same as that observed in Example III using a silicic acid-cellulose column.

EXAMPLE VII

Repetition of the procedures of Examples I and II using the following microorganisms in place of *S. Flocculus*, Isolate BA–163, produces streptonigrin together with the minor components previously described:

| Isolate: | ATCC |
| --- | --- |
| BA–89818—*Streptomyces flocculus* | 13855 |
| BA–90744—*Streptomyces flocculus* | 13856 |
| BA–90792—*Streptomyces flocculus* | 13860 |
| BA–90796—*Streptomyces flocculus* | 13857 |
| BA–90926—*Streptomyces flocculus* | 13861 |
| BA–90930—*Streptomyces flocculus* | 13862 |
| BA–91124—*Streptomyces flocculus* | 13858 |

EXAMPLE VIII

A fermentation broth is prepared as described in Example I, and aseptically filtered through a bacteriological filter to provide a sterile filtrate which is frozen and dried from the frozen state. The dried residue then is a composition containing about 0.1% by weight of streptonigrin.

EXAMPLE IX

Following the procedure of Example II, but using the nutrient medium given below and *S. flocculus*, Isolate X–13, a streptonigrin and the other components are obtained.

|  | G./l. |
|---|---|
| Dextrose | 10.0 |
| Diammonium phosphate | 2.0 |
| Egg albumen | 0.25 |
| Corn steep liquor | 25.0 |
| Distilled water to volume. | |

EXAMPLE X

Substitution of *S. flocculus*, Isolate BA–4721 for *S. flocculus*, Isolate BA–163 of Example II produces streptonigrin together with other listed components.

EXAMPLE XI

A 0.0001% solution of pure crystaline streptonigrin, prepared as described in Example II, is aseptically prepared using isotonic saline as the vehicle. This solution is then satisfactory for parenteral use in the treatment of sensitive infections.

EXAMPLE XII

Equivalent quantities of pure crystalline streptonigrin (Example II) and of potassium hydroxide are dissolved in water, filtered, and the clear solution frozen and dried from the frozen state. The powder remaining is the potassium salt of streptonigrin.

In similar fashion, calcium hydroxide, magnesium hydroxide, sodium hydroxide, and lithium hydroxide yield the calcium, magnesium, sodium, and lithium salts.

The metal salts of SN–F, SN–$P_1$, SN–$P_2$, SN–$A_1$ and SN–$A_2$ are likewise prepared by substituting the desired component for streptonigrin.

EXAMPLE XIII

Equivalent quantities of sodium acetate and streptonigrin are dissolved in glacial acetic acid. The mixture is frozen, and dried from the frozen state to afford the sodium salt of streptonigrin.

EXAMPLE XIV

Methyl ester of streptonigrin

METHOD A.—DIAZOMETHANE

To a solution of streptonigrin in dioxane there is added a slight excess of diazomethane in ether solution. After standing at room temperature for approximately 5 min., the solution is evaporated to dryness. The residue is taken up in methylene chloride and washed once with 2% aqueous sodium bicarbonate to remove unchanged streptonigrin. The methylene chloride layer is washed with water, concentrated to small volume and an equal volume of ether added. The methyl ester crystallizes as grey-brown rectangular plates; M.P. 270°–275° C.

METHOD B.—METHANOL

A mixture of streptonigrin (1 gm.), methyl alcohol (25 ml.) and Dowex–50, hydrogen form, (1 gm.) are refluxed gently for about 2 hours. The reaction is checked for completion by treating an aliquot of the solution with ferric chloride; the absence of color being indicative of complete reaction. The mixture is then filtered and the filtrate evaporated to dryness to give the methyl ester. An additional quantity of product is obtained by extracting the resin with pyridine (30 ml.), concentrating the extract and precipitating the methyl ester by addition of methyl alcohol.

The same product is obtained by each method. It is a grey-brown crystalline material; M.P. 270°–275° C.

*Analysis.*—Calcd. for $C_{26}H_{24}O_8N_4$: 59.99% C; 4.65% H; 10.77% N; 24.59% O (by difference); 23.80% methoxyl. Found: 59.88% C; 4.75% H; 10.51% N; 24.86% O (by difference); 23.77% methoxyl.

Higher alkyl esters are likewise prepared by substitution of methyl alcohol by ethyl, propyl and butyl alcohols.

In like manner, components SN–F, SN–$P_1$, SN–$P_2$, SN–$A_1$ and SN–$A_2$ are transformed to their respective esters.

EXAMPLE XV

Dimethyl streptonigrin

Dimethyl sulfate (2 cc.) is added to a solution of streptonigrin (1 g.) in acetone (100 cc.). Potassium carbonate (10 g.) is added, the mixture refluxed for 6 hours, filtered and concentrated to small volume. The product which separates is crystallized from chloroform-methanol (1–1); M.P. 230°–232° C.

*Analysis.*—Calcd. for $C_{27}H_{26}O_8N_4$: 60.67% C; 4.90% H; 10.48% N; 23.95% O (by difference); 29.03% methoxyl. Found: 60.74% C; 4.95% H; 10.71% N; 23.60% O (by difference); 28.39% methoxyl.

Application of this procedure to the methyl ester of streptonigrin produces the same product.

EXAMPLE XVI

Methyl ether of streptonigrin

The dimethyl streptonigrin product of the preceding example (1 g.) is dissolved in 100 cc. of methanol. The solution is heated to reflux, nitrogen bas bubbled through the solution, and a solution of 1 g. sodium hydrosulfite in 5 cc. water added. (The solid becomes a bright yellow on addition of the hydrosulfite.) Potassium hydroxide (5 g. in 10 cc. water) is added and the mixture refluxed for one hour. Glacial acetic acid (10 cc.) is added, the flow of nitrogen discontinued, and the mixture cooled, concentrated and shaken between chloroform-water. The chloroform extract is dried over anhydrous sodium sulfate, concentrated and the product crystallized from chloroform-methanol (1–1), M.P. 270° C.

*Analysis.*—Calcd. for $C_{26}H_{24}O_8N_4$: 59.99% C; 4.65% H; 10.77% N; 24.59% O (by difference); 23.80% methoxyl. Found: 59.68% C; 4.82% H; 11.03% N; 24.59% O (by difference); 23.29% methoxyl.

EXAMPLE XVII

Acetylation of streptonigrin

A. MONOACETYLATION

Streptonigrin (1 g.) in acetic anhydride (10 ml.) and pyridine (2 ml.) is held for 2–3 days at room temperature. The solution is then poured into water, acidified with dilute sulfuric acid and extracted with chloroform. The extract is concentrated and put on a chromatographic column of silicic acid in chloroform. Elution first with chloroform followed by 1:3 ethyl acetate-chloroform gives two major bands. The corresponding fractions from each band are concentrated and the products crystallized from pyridine-ethanol.

Acetate (I) is obtained from the first band. It crystallizes as deep brown rectangular plates; M.P. 210–212° C.

*Analysis.*—Calcd. for $C_{27}H_{26}O_9N_4$: C, 58.90; H, 4.76; N, 10.18; acetyl (I), 7.82. Found: C, 58.42; H, 4.46; N, 9.68; acetyl, 7.63.

Acetate (II) is obtained from the second band. It crystallizes as brownish pink needles; M.P. 237–239° C.

*Analysis.*—Calcd. for $C_{27}H_{26}O_9N_4$: C, 58.90; H, 4.76; N, 10.18; acetyl (I), 7.82. Found: C, 57.89; H, 4.51; N, 10.02; acetyl, 7.65.

B. TETRA-ACETYL DERIVATIVE

A solution of streptonigrin in acetic anhydride (10 ml.) and boron trifluoride-etherate (2–3 drops) is stored for

17

24 hours at room temperature. The solution is then poured into water, the solid filtered and crystallized from acetone-ethanol. The acetate separates as bright yellow rectangular prisms, M.P. 206°–208° C. Yield, 0.7 g.

*Analysis.*—Calcd. for $C_{33}H_{32}O_{13}N_4$: C, 57.22; H, 4.66; N, 8.09; acetyl (4), 24.86. Found: C, 56.42; H, 4.96; N, 8.03; acetyl, 24.89.

EXAMPLE XVIII

*Desaminostreptonigrin*

Streptonigrin (1 g.) is left at room temperature in 1 N sodium hydroxide (25 ml.) for 20–24 hours. The solution is then acidified and extracted twice with chloroform. Concentration of the extract and two crystallizations from pyridine-ethanol gives desaminostreptonigrin as brick-red long needles; M.P. 270°–275° C. Yield, 0.69.

*Analysis.*—Calcd. for $C_{25}H_{21}O_9N_3$: C, 59.17; H, 4.17; N, 8.28; $OCH_3$(3), 18.34; C—$CH_3$, 2.96. Found: C, 58.64; H, 4.29; N, 8.21; $OCH_3$, 17.70; C—$CH_3$, 2.75.

EXAMPLE XIX

*Methylation of desaminostreptonigrin*

A. MONOMETHYL DESAMINOSTREPTONIGRIN

Desaminostreptonigrin (1 g.) is refluxed in methanol (50 ml.) with boron trifluoride-etherate (1 ml.) for 20–24 hours. The crystalline solid which separates is filtered and recrystallized from pyridine-methanol. The methyl ester separates out as coppery brown plates; M.P. 240–242° C. Yield, 0.6 g.

*Analysis.*—Calcd. for $C_{26}H_{23}O_9N_3$, $H_2O$: C, 57.88; H, 4.67; N, 7.79; $OCH_3$, 23.80. Found: C, 58.44; H, 4.60; N, 7.95; $OCH_3$, 22.52.

B. DIMETHYL DESAMINOSTREPTONIGRIN

Desaminostreptonigrin (1 g.) is dissolved in dioxane (25 ml.) and treated with an excess of diazomethane. After 5 minutes, acetic acid is added to decompose the diazomethane and the solution concentrated. The concentrate is shaken between chloroform and aqueous bicarbonate and the solvent layer separated and concentrated to dryness. The produce is crystallized from a mixture of chloroform and methanol. The dimethyl derivative forms brick-red rectangular plates; M.P. 225–228° C. Yield, 0.7 g.

*Analysis.*—Calcd. for $C_{27}H_{25}O_9N_3$: C, 60.56; H, 4.71; N, 7.85; $OCH_3$, 28.97. Found: C, 59.89; H, 4.93; N, 7.64; $OCH_3$, 28.75.

EXAMPLE XX

*Triacetyl dihydrostreptonigrin*

Streptonigrin (1 g.) is hydrogenated in a mixture of acetic anhydride (5 ml.), anhydrous sodium acetate (1 g.) and Adam's catalyst (0.2 g.) in a Parr apparatus for 24 hours. The mixture is filtered and diluted with water. After 15 minutes the precipitated solid is filtered and washed with water. It is taken up in chloroform and shaken once with cold aqueous sodium bicarbonate. The aqueous layer is acidified, the solid filtered and crystallized from ethanol. Triacetyl dihydrostreptonigrin separates as pale yellow needles; yield 0.5 g.

*Analysis.*—Calcd. for $C_{31}H_{30}O_{11}N_4$: C, 58.67; H, 4.77; N, 8.83; acetyl, 20.35. Found: C, 58.26; H, 4.83; N, 8.74; acetyl, 19.27.

EXAMPLE XXI

*Streptonigrin hydrazide*

To a solution of 0.5 g. of streptonigrin methyl ester in 2 cc. of dioxane is added 2 cc. of hydrazine hydrate (99%). The mixture is allowed to stand at room temperature for 2 days, then poured into water. The aqueous mixture is extracted with choloform, the chloroform extract dried with anhydrous sodium sulfate and evaporated to dryness. The product is crystallized from 1:1 chloroform:methanol as dark brown crystals; M.P. 275–280° C. (dec.).

18

In like manner substitution of hydrazine by ammonia produces the amide of streptonigrin.

EXAMPLE XXII

*Ammonium salt of streptonigrin*

To a solution of streptonigrin in dioxane (0.5 g. in 5 cc.) is added the stoichiometric amount of alcoholic ammonia (containing 10% $NH_3$) and the mixture allowed to stand overnight. The ammonium salt is precipitated from solution by the addition of ether, removed by filtration, washed with ether and dried.

Repetition of this procedure using the following amines in place of ammonia produces the corresponding salts: diethylamine, monoethanolamine, ethylenediamine, N,N-dibenzylethylenediamine.

What is claimed is:

1. A process for the production of an antibiotic containing product which comprises cultivating a strain of microorganism selected from the group consisting of

|  | ATCC |
|---|---|
| Streptomyces flocculus | 13257 |
| Streptomyces flocculus | 13535 |
| Streptomyces flocculus | 13536 |
| Streptomyces bottropensis | 13854 |
| Streptomyces fungicidus | 13853 |
| Streptomyces flocculus | 13852 |
| Streptomyces flocculus | 13851 |
| Streptomyces flocculus | 13850 |
| Streptomyces flocculus | 13859 |
| Streptomyces flocculus | 13855 |
| Isolate BA-90744 | 13856 |
| Streptomyces flocculus | 13860 |
| Streptomyces flocculus | 13857 |
| Streptomyces flocculus | 13861 |
| Streptomyces flocculus | 13862 |
| Streptomyces flocculus | 13858 | in an aqueous nutrient medium under submerged aerobic conditions until substantial antibiotic activity is imparted to said medium.

2. A process as in claim 1 wherein the antibiotic substances are recovered from the fermentation broth.

3. The process of claim 2 wherein the antibiotic substances are recovered by solvent extraction.

4. The process of claim 2 wherein the antibiotic substances are recovered by adjusting the fermentation broth to a pH of up to about pH 7.2, filtering the mycelium and extracting the filtrate with a water immiscible organic solvent.

5. The process of separating a mixture of antibiotic substances streptonigrin F, streptonigrin $A_1$, streptonigrin $A_2$, streptonigrin, streptonigrin $P_1$ and streptonigrin $P_2$ which comprises contacting a chloroform solution thereof with silicic acid-cellulose (2:1) whereby the antibiotic substances are adsorbed, selectively eluting the antibiotic substances therefrom by means of chloroform containing increasing amounts of ethyl acetate and recovering said antibiotics therefrom.

6. The process of separating a mixture of antibiotic substances streptonigrin F, streptonigrin $A_1$, streptonigrin $A_2$, streptonigrin, streptonigrin $P_1$, and streptonigrin $P_2$ which comprises contacting a pyridinemethanol (1:3) solution thereof with diethylaminoethylcellulose whereby the antibiotic substances are adsorbed, selectively eluting the antibiotic substances therefrom with methanol containing increasing amounts of 0.1% acetic acid and recovering said antibiotics therefrom.

7. The process of separating a mixture of antibiotic substances streptonigrin F, streptonigrin $A_1$, streptonigrin $A_2$, streptonigrin, streptonigrin $P_1$ and streptonigrin $P_2$ which comprises countercurrent distribution in the system ethylacetate—3% phosphate buffer (pH 7.5) and recovery of the said antibiotics therefrom.

8. A compound selected from the group consisting of 5 - amino - 6 - (6 - methoxy - 5,8 - dihydro - 7 - amino- 5,8 - dioxo - 2 - quinolyl) - 4 - (2 - hydroxy - 3,4 - dimethoxyphenyl)-3-methylpicolinic acid, the lower alkyl esters, the monomethyl ether, the hydrazide, the ammonium and the alkali metal and alkaline earth metal salts thereof.

9. 5 - amino - 6 - (6 - methoxy - 5,8 - dihydro - 7- amino - 5,8 - dioxo - 2 - quinolyl) - 4 - (2 - hydroxy-3,4-dimethoxyphenyl)-3-methylpicolinic acid.

10. The methyl ester of the compound of claim 9.
11. The sodium salt of the compound of claim 9.
12. The calcium salt of the compound of claim 9.
13. The hydrazide of the compound of claim 9.
14. An antibiotic substance selected from the group consisting of streptonigrin F, a crystalline substance; which substance is weakly acidic, slightly soluble in water at neutral and acidic pH's and more soluble therein at alkaline pH's, very slightly soluble in ether, benzene, methylene chloride, and moderately soluble in ethyl acetate, the lower alcohols, and acetone; which crystallizes as red brown crystals from acetone-ethylacetate (1:4) and has a melting point of 185–187° C. (dec.); which substance exhibits absorption maxima in the ultraviolet region of the spectrum when dissolved in methanol at 245 mμ and 375–380 mμ with $E_{1cm}^{1\%}$ values of 850 and 370 respectively and, when measured in a KBr pellet containing 0.3% of the product, exhibits absorption maxima in the infrared region of the spectrum at 3410, 3330, 3250, 2920, 1735, 1680, 1630, 1600, 1584, 1564, 1478, 1440, 1400, 1370, 1339, 1270, 1230, 1208, 1180, 1162, 1100, 1092, 1071, 1050, 1036, 1008, 918, 873, 860, 828, 822, 806, 788, 760, 744, 702, 684 and 658 reciprocal centimeters; and which contains the elements carbon, hydrogen, nitrogen and oxygen in the following percentages by weight:

Carbon _____ 60.54
Hydrogen _____ 4.36
Nitrogen _____ 11.42
Oxygen (by difference) _____ 23.58 which substance provides a dark greenish-brown color solution with alcoholic ferric chloride, dissolves in concentrated sulfuric acid to give a bright yellow solution, and the color of a dilute aqueous solution thereof changes from reddish-brown to bright-yellow upon adding sodium bisulfite thereto, said bright yellow solution providing a reddish-brown antibiotically active extract on shaking with a water immiscible organic solvent; the lower alkyl esters, and the alkali metal and alkaline earth metal salts thereof.

15. An antibiotic substance selected from the group consisting of streptonigrin $P_1$, a crystalline substance; which substance is weakly acidic, slightly soluble in water at neutral and acidic pH's and more soluble therein at alkaline pH's, very slightly soluble in ether, benzene, methylene chloride, and moderately soluble in ethyl acetate, the lower alcohols, and acetone; which crystallizes as red brown crystals from acetone-ethyl acetate (1:4) and has a melting point of 190–197° C. (dec.); which substance exhibits absorption maxima in the ultraviolet region of the spectrum when dissolved in methanol at 245 mμ (shoulder) and 375–380 mμ with $E_{1cm}^{1\%}$ values of 700 and 340 respectively and, when measured in a KBr pellet containing 0.3% of the product, exhibits absorption maxima in the infrared region of the spectrum at 3410, 3340, 3220, 2910, 2820, 1719, 1680, 1610, 1588, 1550, 1500, 1461, 1440, 1405, 1372, 1344, 1318, 1280, 1230, 1186, 1091, 1072, 1047, 1023, 995, 919, 890, 868, 814, 804, 784, 746, 710, 682 and 652 reciprocal centimeters; and which contains the elements carbon, hydrogen, nitrogen and oxygen in the following percentages by weight:

Carbon _____ 57.97
Hydrogen _____ 4.72
Nitrogen _____ 11.02
Oxygen (by difference) _____ 26.29 which substance provides a dark greenish-brown colored solution with alcoholic ferric chloride, dissolves in concentrated sulfuric acid to give a bright yellow solution, and the color of a dilute aqueous solution thereof changes from reddish-brown to bright-yellow upon adding sodium bisulfite thereto, said bright yellow solution providing a reddish-brown antibiotically active extract on shaking with a water immiscible organic solvent; the lower alkyl esters, and the alkali metal and alkaline earth metal salts thereof.

16. An antibiotic substance selected from the group consisting of streptonigrin $P_2$, a crystalline substance; which substance is weakly acidic, slightly soluble in water at neutral and acidic pH's and more soluble therein at alkaline pH's very slightly soluble in ether, benzene, methylene chloride, and moderately soluble in ethyl acetate, the lower alcohols, and acetone; which crystallizes as red brown crystals from acetone-ethylacetate (1:4) and has a melting point of 187–195° C. (dec.); which substance exhibits absorption maxima in the ultraviolet region of the spectrum when dissolved in methanol at 245 mμ and 375–380 mμ with $E_{1cm}^{1\%}$ values of 800 and 336, respectively and when measured in a KBr pellet containing 0.3% of the product exhibits absorption maxima in the infrared region of the spectrum at: 3320, 3210, 2900, 1715, 1675, 1630, 1608, 1570, 1555, 1500, 1460, 1440, 1405, 1375, 1342, 1280, 1228, 1184, 1090, 1072, 1045, 1022, 995, 918, 890, 868, 814, 782, 747, 709, and 682 reciprocal centimeters; and which contains the elements carbon, hydrogen, nitrogen and oxygen in the following percentages by weight:

Carbon _____ 58.12
Hydrogen _____ 4.50
Nitrogen _____ 10.60
Oxygen (by difference) _____ 26.78 which substance provides a dark greenish-brown colored solution with alcoholic chloride, dissolves in concentrated sulfuric acid to give a bright yellow solution, and the color of a dilute aqueous solution thereof changes from reddish-brown to bright-yellow upon adding sodium bisulfite thereto, said bright yellow solution providing a reddish-brown antibiotically active extract on shaking with a water immiscible organic solvent; the lower alkyl esters, and the alkali metal and alkaline earth metal salts thereof.

17. An antibiotic composition comprising a substantial proportion of a non-toxic carrier and at least about 0.0001% of a product selected from the group consisting of the compounds of claim 8, the compounds of claim 14, the compounds of claim 15 and the compounds of claim 16.

18. A process for treating infections which comprises administering to a lower animal host a daily dose of about 50–500 mcg./kg. of body weight of a compound selected from the group consisting of:
(a) 5 - amino - 6 - (6 - methoxy - 5,8 - dihydro - 7- amino - 5,8 - dioxo - 2 - quinolyl) - 4 - (2 - hydroxy-3,4 - dimethoxyphenyl) - 3 - methylpicolinic acid, the lower alkyl esters, the monomethyl ether, the hydrazide, the ammonium and the alkali metal and alkaline earth metal salts thereof,
(b) streptonigrin F, a crystalline substance; which substance is weakly acidic, slightly soluble in water at neutral and acidic pH's and more soluble therein at alkaline pH's, very slightly soluble in ether, benzene, methylene chloride, and moderately soluble in ethyl acetate, the lower alcohols, and acetone; which crystallizes as red brown crystals from acetone-ethylacetate (1:4) and has a melting point of 185–187° C. (dec.); which substance exhibits absorption maxima in the ultraviolet region of the spectrum when dissolved in methanol at 245 mμ, and 375–380 mμ with $E_{1cm}^{1\%}$ values of 850 and 370, respectively and, when measured in a KBr pellet containing 0.3% of the product, exhibits absorption maxima in the infrared region of the spectrum at 3410, 3330, 3250, 2920, 1735, 1680, 1630, 1600, 1584, 1564, 1478, 1440, 1400, 1370, 1339, 1270, 1230, 1208, 1180, 1162, 1100, 1092, 1071, 1050, 1036, 1008, 918, 873, 860, 828, 822, 806, 788, 760, 744, 702, 684, and 658 reciprocal centimeters; and which contains the elements carbon, hydrogen, nitrogen and oxygen in the following percentages by weight:

| | |
|---|---|
| Carbon | 60.54 |
| Hydrogen | 4.36 |
| Nitrogen | 11.42 |
| Oxygen (by difference) | 23.58 | which substance provides a dark greenish-brown color solution with alcoholic ferric chloride, dissolves in concentrated sulfuric acid to give a bright yellow solution, and the color of a dilute aqueous solution thereof changes from reddish-brown to bright-yellow upon adding sodium bisulfite thereto, said bright yellow solution providing a reddish-brown antibiotically active extract on shaking with a water immiscible organic solvent; the lower alkyl esters, and the alkali metal and alkaline earth metal salts thereof, (c) streptonigrin $P_1$, a crystalline substance; which substance is weakly acidic, slightly soluble in water at neutral and acidic pH's and more soluble therein at alkaline pH's, very slightly soluble in ether, benzene, methylene chloride, and moderately soluble in ethyl acetate, the lower alcohols, and acetone; which crystallizes as red brown crystals from acetone-ethyl acetate (1:4) and has a melting point of 190–197° C. (dec.); which substance exhibits absorption maxima in the ultraviolet region of the spectrum when dissolved in methanol at 245 mμ (shoulder) and 375–380 mμ with $E_{1cm}^{1\%}$ values of 700 and 340, respectively and, when measured in a KBr pellet containing 0.3% of the product, exhibits absorption maxima in the infrared region of the spectrum at 3410, 3340, 3220, 2910, 2820, 1719, 1680, 1610, 1588, 1550, 1500, 1461, 1440, 1405, 1372, 1344, 1318, 1280, 1230, 1186, 1091, 1072, 1047, 1023, 995, 919, 890, 868, 814, 804, 784, 746, 710, 682, and 652 reciprocal centimeters; and which contains the elements carbon, hydrogen, nitrogen and oxygen in the following percentages by weight:

| | |
|---|---|
| Carbon | 57.97 |
| Hydrogen | 4.72 |
| Nitrogen | 11.02 |
| Oxygen (by difference) | 26.29 | which substance provides a dark greenish-brown colored solution with alcoholic ferric chloride, dissolves in concentrated sulfuric acid to give a bright yellow solution, and the color of a dilute aqueous solution thereof changes from reddish-brown to bright yellow upon adding sodium bisulfite thereto, said bright yellow solution providing a reddish-brown antibiotically active extract on shaking with a water immiscible organic solvent; the lower alkyl esters, and the alkali metal and alkaline earth metal salts thereof, (d) streptonigrin $P_2$, a crystalline substance; which substance is weakly acidic, slightly soluble in water at neutral and acidic pH's and more soluble therein at alkaline pH's, very slightly soluble in ether benzene, methylene, chloride, and moderately soluble in ethyl acetate, the lower alcohols, and acetone; which crystallizes as red brown crystals from acetone-ethylacetate (1:4) and has a melting point of 187–195° C. (dec.); which substance exhibits absorption maxima in the ultraviolet region of the spectrum when dissolved in methanol at 245 mμ and 375–380 mμ with $E_{1cm}^{1\%}$ values of 800 and 356, respectively and when measured in a KBr pellet containing 0.3% of the product exhibits absorption maxima in the infrared region of the spectrum at: 3320, 3210, 2900, 1715, 1675, 1630, 1608, 1570, 1555, 1500, 1460, 1440, 1405, 1375, 1342, 1280, 1228, 1184, 1090, 1072, 1045, 1022, 995, 918, 890, 868, 814, 782, 747, 709, and 682 reciprocal centimeters; and which contains the elements carbon hydrogen, nitrogen and oxygen in the following percentages by weight:

| | |
|---|---|
| Carbon | 58.12 |
| Hydrogen | 4.50 |
| Nitrogen | 10.60 |
| Oxygen (by difference) | 26.78 | which substance provides a dark greenish-brown colored solution with alcoholic chloride, dissolves in concentrated sulfuric acid to give a bright yellow solution, and the color of a dilute aqueous solution thereof changes from reddish-brown to bright yellow upon adding sodium bisulfite thereto, said bright yellow solution providing a reddish-brown antibiotically active extract on shaking with a water immiscible organic solvent; the lower alkyl esters, and the alkali metal and alkaline earth metal salts thereof.

References Cited

UNITED STATES PATENTS 2,970,943  2/1961  Bromer et al. _____ 195—80

FOREIGN PATENTS 61,749  12/1960  Australia.
1,089,928  9/1960  Germany.
848,936  6/1962  Great Britain.

OTHER REFERENCES

Antibiotics & Chemotherapy, 11(3), March 1961, pp. 147–189.

Rao et al., Antibiotics Annual, 1959–1960, pp. 950–953, report of papers presented at the 7th Antibiotic Symposium, Wash., D.C. Nov. 4–6, 1959.

ALBERT T. MEYERS, *Primary Examiner.*

FRANK CACCIAPAGLIA, JR., JULIAN S. LEVITT, *Examiners.*

LEROY B. RANDALL, *Assistant Examiner.*

UNITED STATES PATENT OFFICE
CERTIFICATE OF CORRECTION

Patent No. 3,372,090                      March 5, 1968

William S. Marsh et al.

It is certified that error appears in the above identified patent and that said Letters Patent are hereby corrected as shown below:

Columns 1 and 2, TABLE I, fifth column, line 3 thereof, for "do" read -- None --; column 10, line 18, for "$C_{27}H_{23}O_9N_3$" read -- $C_{26}H_{23}O_9N_3$ --; column 16, line 33, for "bas" read -- gas --; column 18, line 26, for "fungicidus" read -- fungicidicus --.

Signed and sealed this 22nd day of July 1969.

(SEAL)
Attest:

Edward M. Fletcher, Jr.                      WILLIAM E. SCHUYLER, JR.
Attesting Officer                              Commissioner of Patents